United States Patent [19]

Lindenfelser et al.

[11] Patent Number: 5,055,863

[45] Date of Patent: Oct. 8, 1991

[54] MULTIPLE IMAGE TRANSFER CAMERA SYSTEM

[75] Inventors: Jerome W. Lindenfelser, Brooklyn Park, Minn.; John A. Lawson, Spring Valley, Ohio

[73] Assignee: Photo Control Corporation, Minneapolis, Minn.

[21] Appl. No.: 546,099

[22] Filed: Jun. 29, 1990

[51] Int. Cl.$^5$ .............................................. G03B 29/00
[52] U.S. Cl. ...................................... 354/75; 358/909
[58] Field of Search ................... 354/75, 76, 109, 111, 354/210; 352/93, 94; 358/909

[56] References Cited

U.S. PATENT DOCUMENTS

| | | | |
|---|---|---|---|
| 3,115,816 | 12/1963 | Muller | 354/114 |
| 3,618,495 | 11/1971 | Kuhns | 354/106 X |
| 3,673,933 | 7/1972 | Hamann | 354/109 X |
| 3,762,293 | 10/1973 | Moodie | 354/124 |
| 4,140,381 | 2/1979 | Douglas | 354/111 |
| 4,283,130 | 8/1981 | Lawson | 354/120 |
| 4,288,153 | 9/1981 | Johnson | 354/414 |
| 4,468,693 | 8/1984 | Fujita et al. | 358/78 |
| 4,511,229 | 4/1985 | Schwartz et al. | 354/105 X |
| 4,525,050 | 6/1985 | Ohaski | 354/195.12 |
| 4,589,750 | 5/1986 | Tomori et al. | 352/141 X |
| 4,633,305 | 12/1986 | Nakayama | 358/101 |
| 4,714,962 | 12/1987 | Levine | 358/209 |
| 4,738,526 | 4/1988 | Larish | 354/76 X |
| 4,739,417 | 4/1988 | Ogawa | 358/310 |
| 4,742,369 | 5/1988 | Ishii et al. | 354/76 X |
| 4,835,563 | 5/1989 | Larish | 354/76 X |
| 4,838,680 | 6/1989 | Nunokawa | 354/62 X |
| 4,888,605 | 12/1989 | Matsumoto | 354/75 |
| 4,888,606 | 12/1989 | Ota | 354/76 |

Primary Examiner—L. T. Hix
Assistant Examiner—Howard B. Blankenship
Attorney, Agent, or Firm—James R. Cwayna

[57] ABSTRACT

A camera system for the simultaneous and substantially exact capturing of images of a subject on separate image reproduction mediums wherein an optical member is interposed between a lens group and a pair of separate, discrete image receiving mediums. One of the mediums is a photographic film and the other is a viewing screen for personal viewing or, alternatively, an electronic system for electronic signal generation, electronic viewing and electronic capture of the image. The optical member allows light rays emanating from the object to pass therethrough to impinge upon one of the mediums while simultaneously reflecting light rays to the second medium. This system allows for the simultaneous transfer and reproduction of the object image onto more than one medium without degradation of the image or depth of field. The system accomplishes the multiple image transfer through a stationary device, thereby eliminating the necessity of moving parts. The system also eliminates problems resulting from refractions of light normally accompanying light ray direction control devices.

6 Claims, 6 Drawing Sheets

MULTIPLE IMAGE TRANSFER CAMERA SYSTEM

FIELD OF THE INVENTION

This invention relates generally to cameras and camera systems wherein the image of the object is available for capture in one plane and viewable in a second plane simultaneously with capture in the first plane and more specifically to a camera system wherein the image of the object is simultaneously transferred to separate, discrete mediums for simultaneous capture of or simultaneous viewing and capture of the images without degradation either between the mediums or between the mediums and the object while retaining high tonal reproduction of the object to provide for exact reproduction thereof.

SHORT SUMMARY OF THE INVENTION

A camera system for the simultaneous and substantially total transfer of light rays emanating from an object to a pair of separate, discrete mediums to provide for substantially exact object image reproduction and capture thereof at either or both of two mediums. The system eliminates image degradation inherent in other multiple image transfer systems.

The basic system includes a frontal lens grouping for initial light ray reception, an optical member for axial direction to separate rear lens groups, a light ray control device and angularly offset light responsive mediums.

The front lens group may include a zoom lens structure while the light ray control device will include, in one instance, a shutter unit, and in alternative instances, a combination of shutters, filters and the like.

The optical member provides a reflective surface having an aperture formed therein to provide for simultaneous passage and reflective direction of light rays to the mediums.

One of the light responsive mediums may include light responsive film; single sheets, standard rolls or long rolls; with means for positioning them at the film plane as required by the focal length of the lens design. A shutter or other light ray control device will be arranged between the optical member and this medium.

The other of the light responsive mediums allows for simultaneous viewing of the image as seen by the first medium. This other medium may simply provide for viewing of the image by a person by arranging a viewing screen at the focal length from the optical member and arranging such screen angularly with respect to transmitted light rays for such viewing. A filter, shutter or other device may be arranged in conjunction with this second medium selection to reduce the light level during the actual exposure.

The other medium may also provide for electronic capture, electronic viewing or the like. In this instance, an electronic signal generating, light sensitive element is properly positioned with respect to the focal planes to generate an electronic signal to be stored or displayed. A separate lens group will, in this instance, be interposed between the optical member for proper reproduction of the light rays onto the electronic signal generating element. This lens combination allows for focusing of the object to be photographed while viewing the electronic image display. When electronic imaging considerations are made, light intensity control devices may be interposed into the light transmission path.

The entire combination of elements provides a system for simultaneous object image capture at separate mediums and the available light intensity may be divided as desired between the mediums without degradation of the images or depth of field.

Obviously, identification or marking means may be included in the system for correlation of captured images for recall thereof.

BACKGROUND AND OBJECTS OF THE INVENTION

In a search of the prior art, as more thoroughly disclosed in a Prior Art Statement, no camera system was found which afforded a structure as provided and disclosed herein for the simultaneous, exact object image transfer and capture utilizing an optical member which enables exact image reproduction without degradation of the images.

Various cameras have been developed with apparatus for directing light rays emanation from a subject to a pair of independent mediums. Such devices include reflex mirrors or coated, reflective and transmissive surfaces arranged angularly to light ray directions, commonly referred to as beam splitters.

A beam splitter performs exactly as it is named. It simply splits a beam into two parts. Such splitting obviously results in two beams each of which is only a portion of the total intensity of the source beam. Additionally, there are internal losses due to imperfections within the normal beam splitter to further lower intensity. Other problems include a change in color and light ray transmittance when beamsplitters are used at various angles of incidence. The system as provided herein allows the available light intensity to be divided as desired without degrading image quality or depth of field.

A reflex mirror provides a beam in a single direction at any one time. As known, a reflex camera system allows a viewer to preview what is to be captured on film but upon shutter action, the mirror is moved from the light path and therefore no longer presents an image for viewing in order to allow the light rays from the subject to pass through the shutter to the film plane. Obviously the mirror is moveable and there is simply no way to capture an image once the mirror has moved. Simultaneous capturing in two distinct planes is not possible.

With the camera system as disclosed herein it is possible to simultaneously view an object image in a first plane while it is being captured in a second plane, or, alternatively, to simultaneously capture the object image in two separate planes. In this manner then, a system affording high quality reproduction is obtained.

The system incorporated herein provides structure for electronic capture as well as film capture of object images with the captures being simultaneously made and each being of high quality.

It is therefore an object of the invention to provide a camera system wherein two images of a single object are individually transmitted to two distinct and separated mediums with each of the images being controlled with respect to one another in desired light and tonal qualities and each of the images is a substantially exact object image.

It is a further object of the invention to provide a camera system wherein an identical pair of object images are attainable on two distinct mediums for selective utilization of the images including capture and retention thereof.

It is a further object of the invention to provide a camera system which provides two identical and simultaneously transmitted images of a single object wherein there is no degradation of the individual images.

It is yet a further object of the invention to provide a camera system wherein an identical pair of object images are provided to two distinct mediums for simultaneous capture thereof with one of the capturing arrangements being light sensitive film material and the other capturing arrangement including electronic signal generation devices, electronic capture devices and electronic image viewing devices.

These other objects and advantages of the invention will more fully appear from a consideration of the accompanying description made in conjunction with the accompanying drawings.

Figure 8:
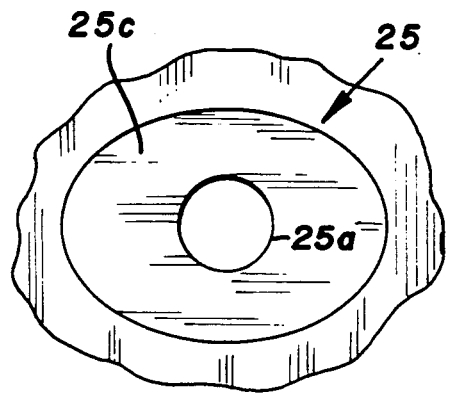
FIG. 8 is a vertical section taken substantially Line 8—8 of FIG. 5.
Figure 9:
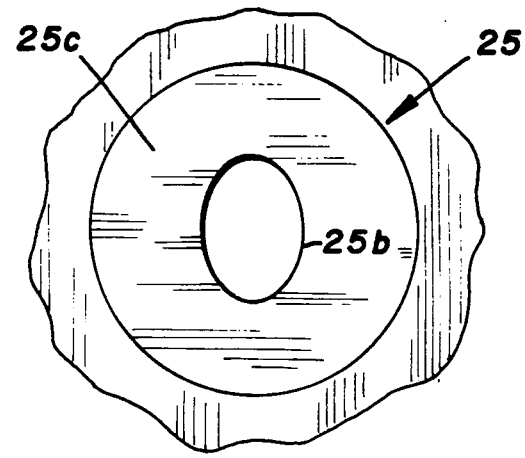
FIG. 9 is a vertical section taken substantially 2 Line 9—9 FIG. 5.
Figure 4:
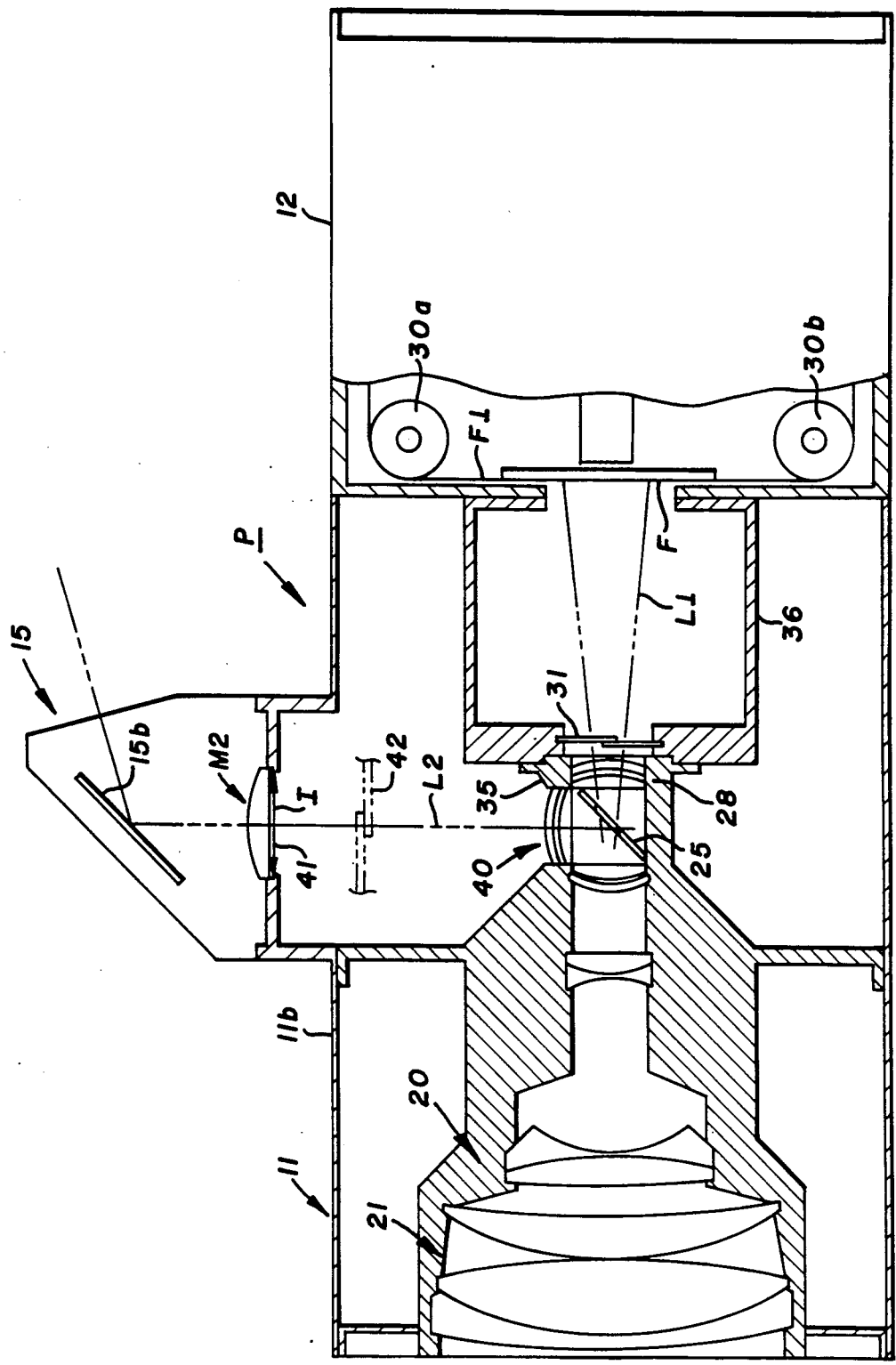
FIG. 4 is a horizontal cross section of the camera unit taken substantially along Line 4—4 of FIG. 2 particularly illustrating the system when allowing for personal viewing of an object image while simultaneously capturing the same.

It should be understood that FIGS. 8 and 9 are equally applicable to being taken at the same position of FIG. 4 in representing the optical device of the system.

DESCRIPTION OF PREFERRED FORMS OF THE INVENTION

While the detailed description hereinafter relates to and discloses two receiving mediums for clarity of communicating the invention, it should be understood that the system applies equally to two or more receiving mediums.

In accordance with the accompanying drawings, two preferred forms of the invention are illustrated with the two forms varying only in the concepts of visual or personal viewing of a transmitted object image as compared to the transmitted object image light rays impinging upon an electronic signal generating device with cooperative electronic signal transmission means, electronic capturing means and electronic image viewing means for utilization of the light rays as transmitted from the object through the system.

In accordance with this disclosure concept, two basic systems are identified throughout the drawings by the indicia P, for personal viewing and, E for electronic utilization and capture. In this manner, the unit as illustrated in FIGS. 1, 2, 4 and 6 is identified generally as P with FIGS. 3, 5 and 7 being generally identified as E. As remaining portions of the two systems are identical, the same indicia is utilized for the same parts throughout the several views.

Both discussed systems include a housing having a front 11 and hingedly connected rear portion 12, with a carrying handle 13. Hingedly attaching the front il and rear elements 12 allow for ease of access for loading film into the rear element 12 and, obviously, closure elements (not shown) are provided for maintaining the front 11 and rear 12 housing elements in a light closed relation. A front lens structure 14 is positioned to extend from the front most surface 11a of the front housing element 11. Various controls are provided on the rearmost surface 12a for the rear housing element 12.

Figure 1:
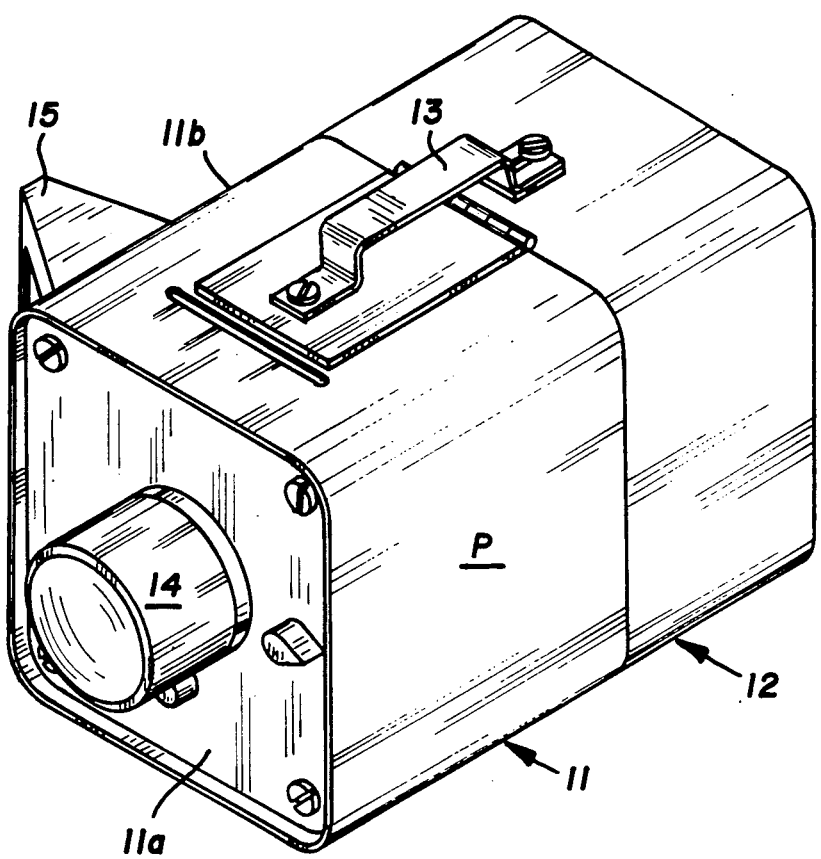
FIG. 1 is a perspective view of a camera unit which is typical of a unit in which the camera system embodying the concepts of the invention would be provided.
Figure 2:
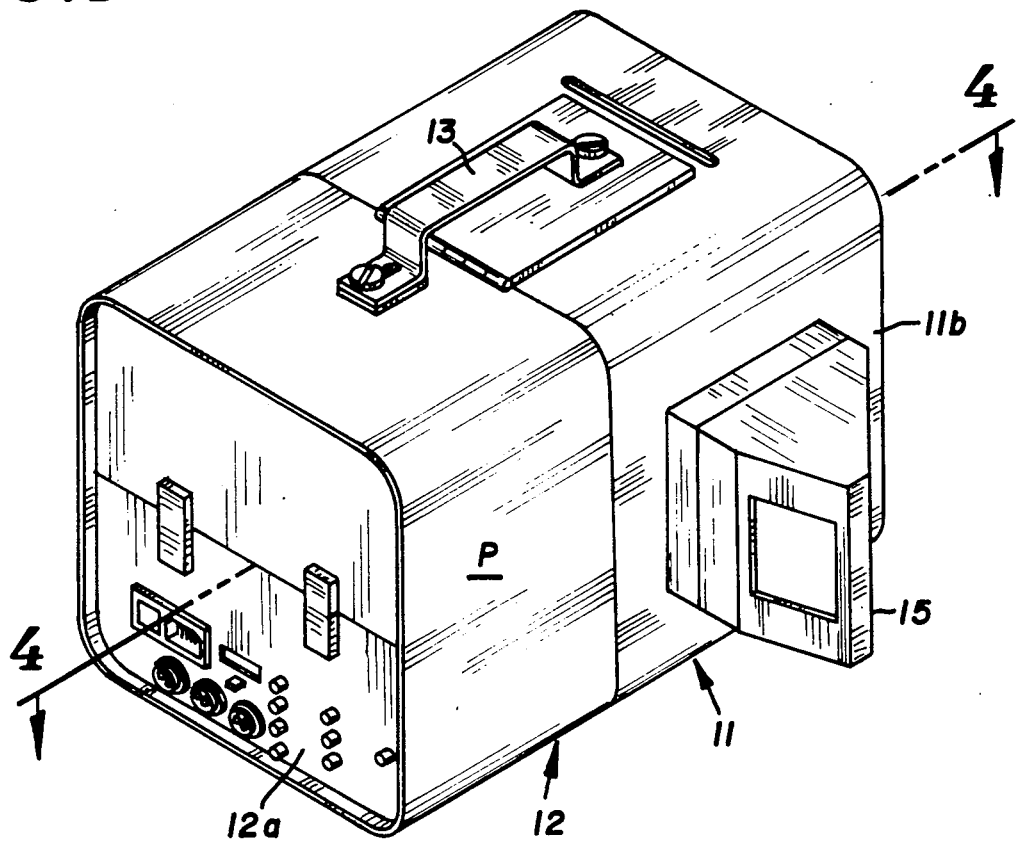
FIG. 2 is a rear perspective view of FIG. 1, particularly illustrating a personal viewing arrangement extending from and located on the side of the camera unit.

The primary structural and visual difference between the two units P and E exists on the left, delivery side 11b of the respective housing fronts 11. As illustrated in FIGS. 1, 2, and 4 a personal view finder 15 is positioned on such side 11b for viewing off an internal reflective mirror 15b arranged and constructed to reflect the image formed on the viewing screen.

Figure 3:
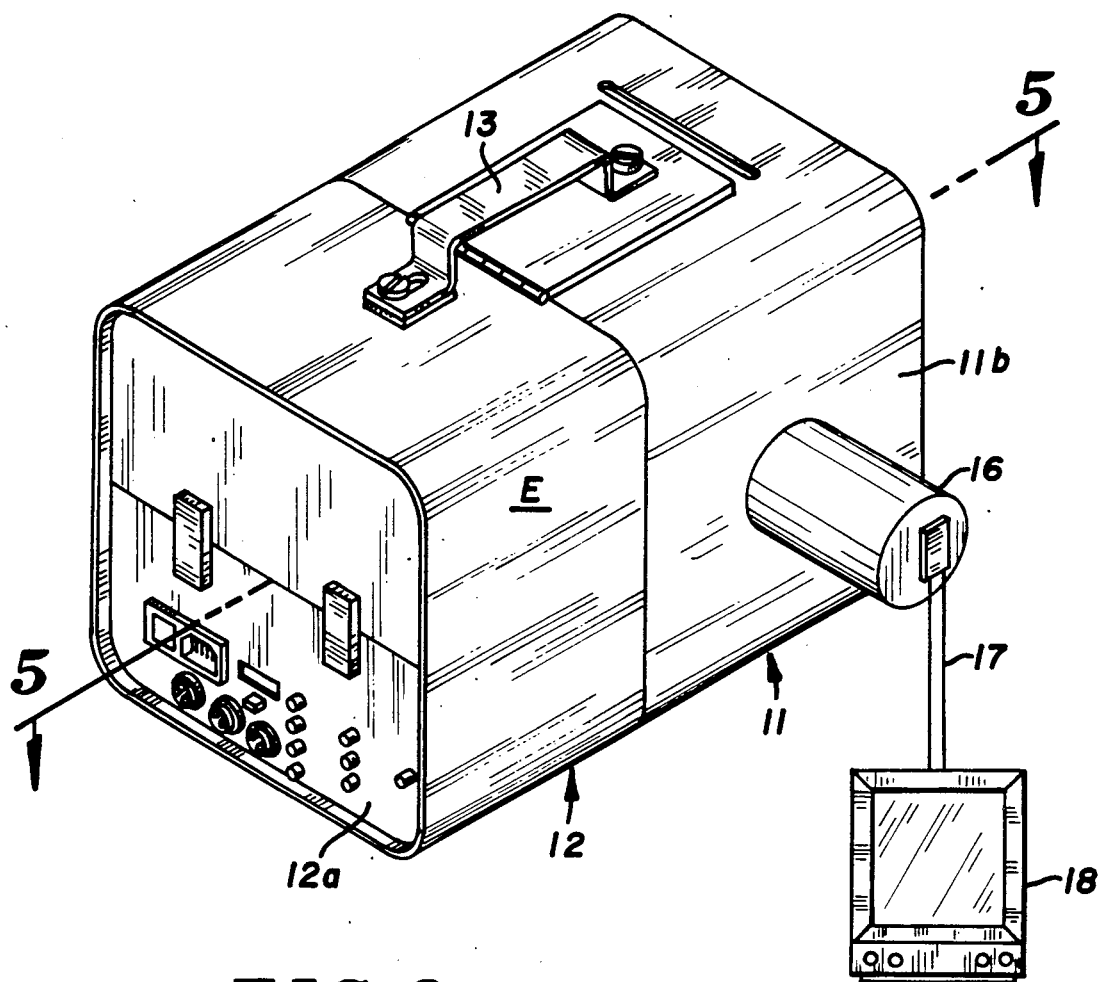
FIG. 3 is a rear perspective view similar to that of FIG. 2 particularly illustrating a modification of the camera unit to accommodate an electronic generating, transmitting and viewing device for electronic capture of images.
Figure 5:
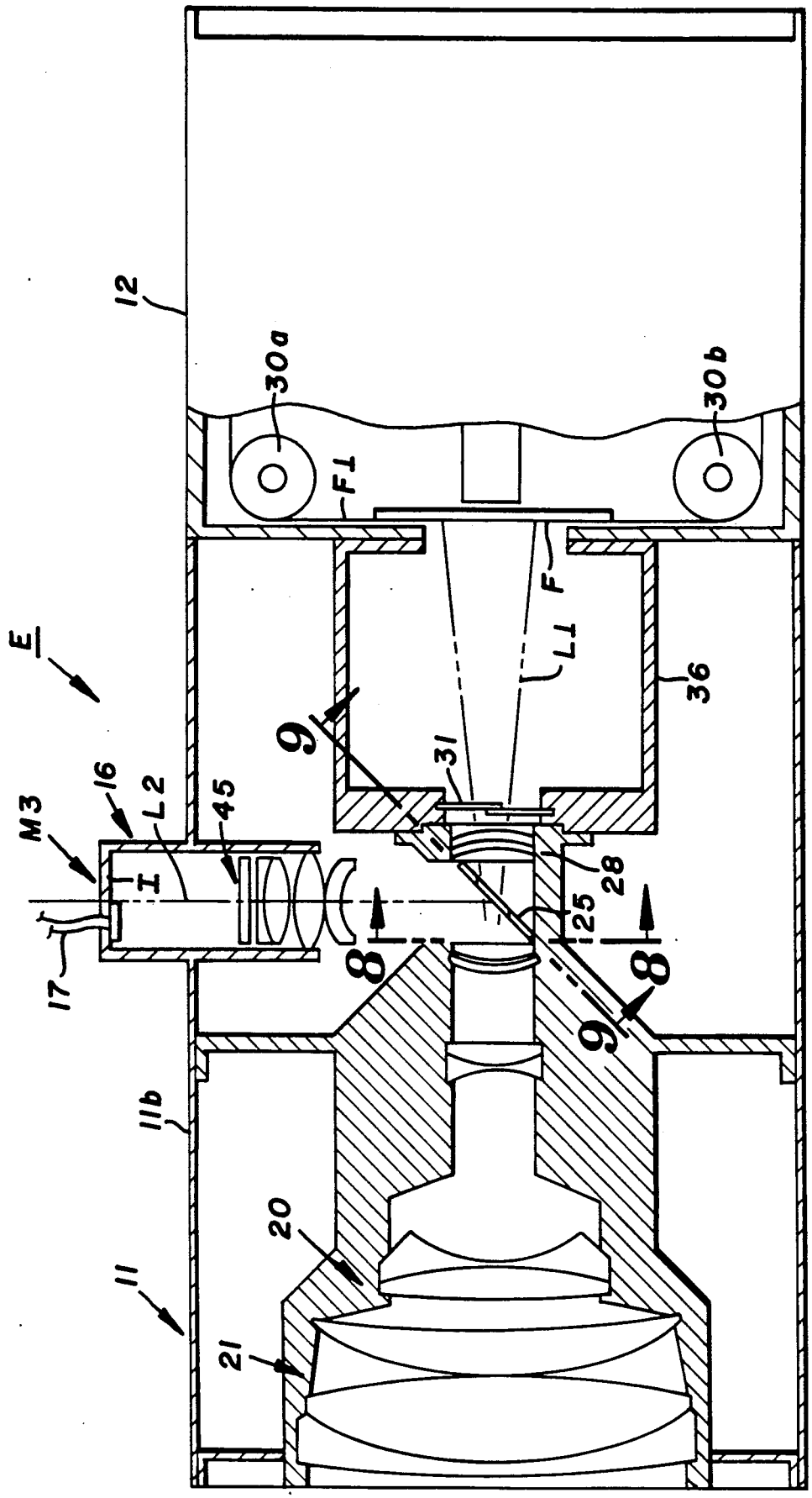
FIG. 5 is a horizontal cross section of the camera unit substantially along Line 5—5 of FIG. 3 particularly illustrating the system when allowing for electronic signal generation and ultimate electronic utilization.

As illustrated in FIGS. 3 and 5, an electronic housing extension 16 is arranged on side 11b of the front housing Il and connective lines 17 are illustrated to extend therefrom to an electronic monitor 18 as representative of an electronic viewing device which obviously could be supplanted by other electronic devices.

It should be noted at this time that throughout the several views the indicia O is utilized with reference to the object, it is utilized with respect to the image and various light rays are designated L with accompanying subscripts.

Arranged within the frontal housing portions 11 is a front group of lenses 20 which may structure for example include a zoom lens 21, all of which are optically selected and calculated to concentrate the object light rays L onto and through the optical member 25 which is positioned in positive relation to the housing 11 and angularly to the axis of the light rays L emanating from the object 0. The concentration of the light rays L is of significance as the optical member 25 forms an integral portion of the system invention in that it both reflects light rays and passes light rays therethrough without any noticeable image quality degradation.

As illustrated in FIGS. 8 and 9, the optical member 25 comprises a planar mirror and aperture combination, the reflective surface of the same being identified 25c with the iris-type aperture being illustrated in its true shape in FIG. 9 being designated 25b and its apparent shape in FIG. 8 being designated 25a. As this optical member 25 is arranged at a 45° angle with respect to light rays L emanating from the object O the true shape of the aperture is that of an ellipse 25b with its apparent shape to the light rays being a circle 25a. Light rays passing through the iris aperture (apparent) 25a are designated L1 with the reflected light rays being designated L2 for the visual viewing form and L3 for the electronic generation form.

The surface of the optical member 25 that serves as the reflective surface 25c is of a particularly selected material coating so as to reflect an extremely high percentage of the light rays L received thereagainst.

Obviously, as the optical member 25 is stationary and does not have to move in order to properly direct light rays L thereagainst and therethrough, it may be permanently affixed to the frontal housing 11 but it should be obvious that the iris, aperture selection is mathematically calculated from lens, focal length and f stop functions and thus, various sized apertures may be required for proper image transmission and therefore this member 25 may be removeably arranged within the unit.

Consideration of the passing light rays L1 illustrates the directive and formative requirement of a lens combination 28 closely associated with the optical member 25 for proper focusing of the transmitted image I upon a first medium M at a proper focal length from the lens combination 28. For descriptive purposes, this position is referred to as a first medium and in this particular instance, this medium M consists of a light responsive photographic film unit at a film plane F with film being moved thereby designated F1.

As illustrated in FIGS. 4 and 5 film advancement rollers 30a, 30b are provided if roll film is utilized and the advancing roller construction may be replaced with film plate mounting elements if it is desirable to singularly expose a selected film unit. It should be considered and the disclosed structure permits, the use of what may be referred to a standard roll film and long or bulk roll film. A standard roll may consist of 24, 36 or some such frame number of length while a long roll film may consist of sufficient length to photograph 100s of subjects. A natural usage of this camera system would be for high volume portrait photography. For these applications it may be advantageous to utilize bulk or long roll supplies of film. It should also be considered that the particular structure of camera housing sections 11, 12 will easily afford cassette units of film with an entire cassette being insertable and removable from the rear 12 housing section of the camera system.

As further illustrated in FIGS. 4, 5, 6 and 7, a light ray control unit such as a shutter 31 is interposed between the forementioned directive lens structure 28 and the medium area M. Such shutter structures are well known in the art as is their function and further explanation is not deemed necessary.

A typical structure, as illustrated in FIGS. 4 and 5 to accommodate the various elements of the light ray receiving area receiving the "passed" through rays is designated 35, 36 to illustrate location and placement structures for the lens structure 28, shutter 31 and medium M. It should be noted that the housing portion 35 may positively or removably position the optical member 25. Again, it should be stated for purposes of reference between the two illustrated systems, personal viewing and electronic utilization that a particular dimension is established from lens structure 28 to the film plane F of the medium M. This dimension is maintained in the personal viewing arrangement of FIGS. 4 and 6 while a variation therefrom is utilized in FIGS. 5 and 7 for accommodation of the electronic system arrangement.

Figure 6:
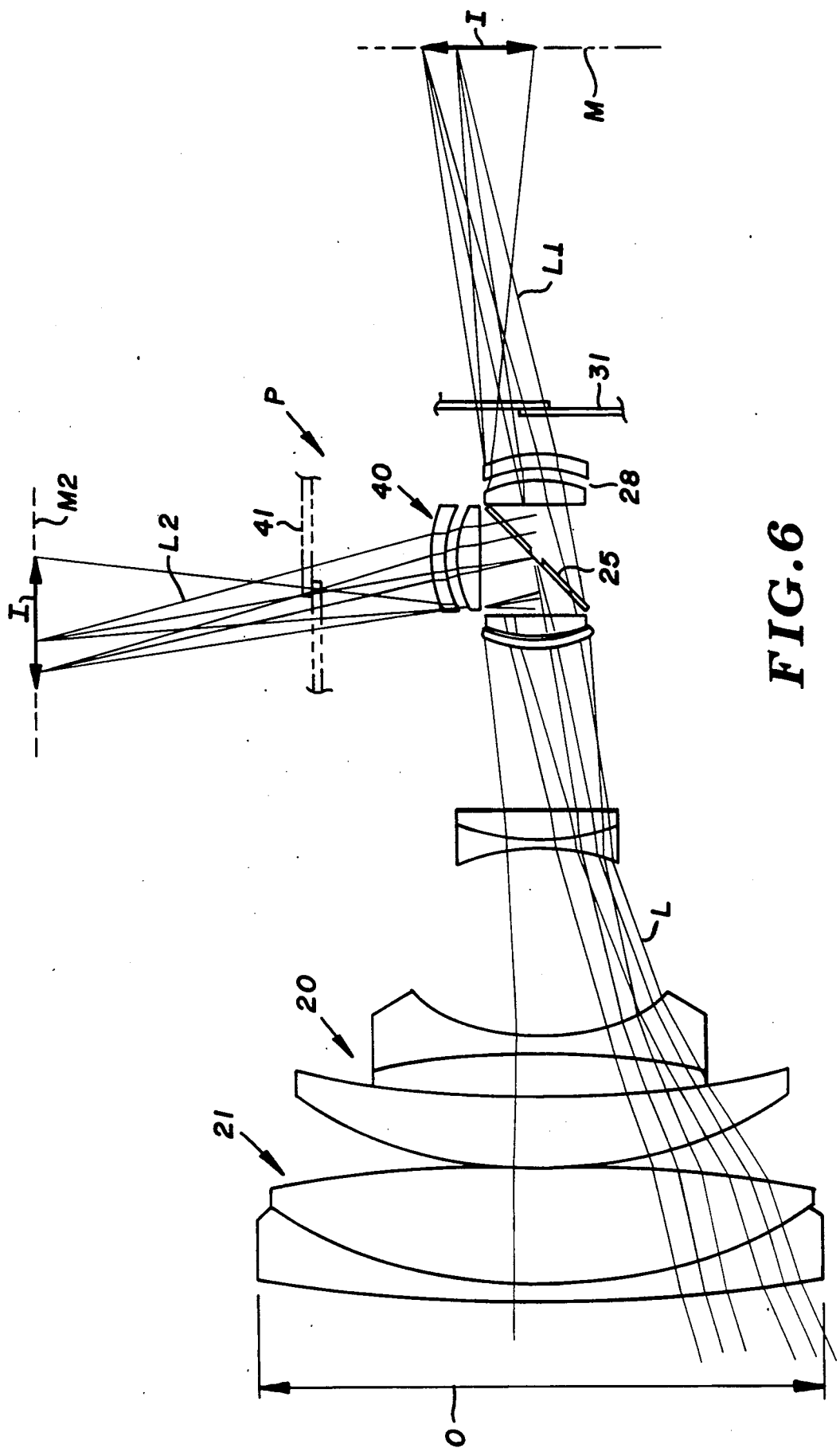
FIG. 6 is a lens and light transmission schematic particularly illustrating the personal viewing system of FIG. 4.

As illustrated in FIGS. 4 and 6, the light rays L2 reflected from the mirrored surface 25c pass through a lens structure 40 which is identical to the lens combination 28 such that the distance to the second medium M2 is identical in size and, again with the elimination of noticeable image degradation, to the image formed at medium M. As shown in FIG. 4, the image is personally viewed upon the internal mirror surface 15B arranged in the housing extension 15. The illustration of FIGS. 4 and 6 each show a light control member to control the light rays L2 reflected from the surface of optical element 25 after passing through the focusing lens arrangement 40. This is designated 41, and may include a filter or a shutter or a combination thereof. Each would be functional to reduce light intensity during the flash or strobe lighting of the object.

The camera system will receive an expected high utilization with the electronic viewing and electronic capturing techniques and structure. The personal viewing for previewing of a proper and properly arranged subject matter or lighting considerations is of import in considering the various uses of the system.

Figure 7:
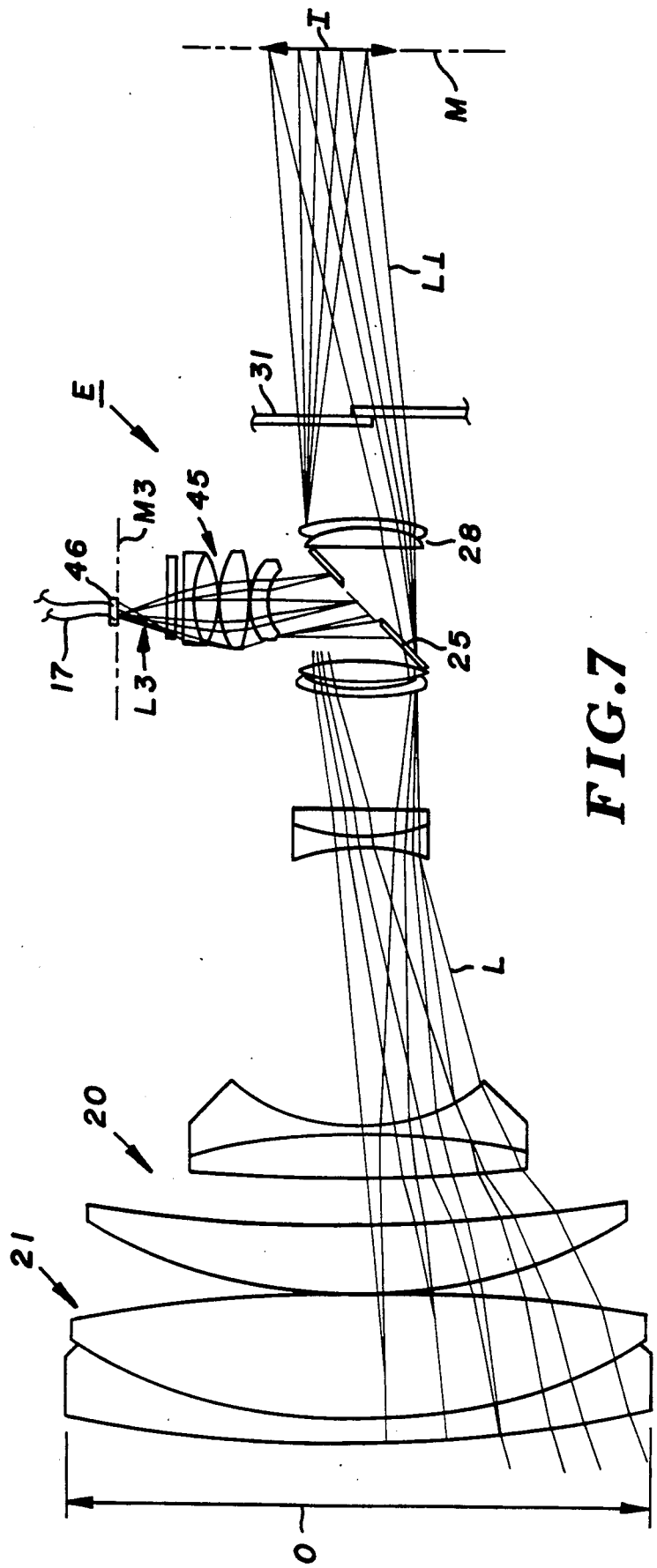
FIG. 7 is a lens and light transmission schematic particularly illustrating the electronic viewing system of FIG. 5.

The electronic signal generating concept for electronic usage including electronic capture of the image is illustrated in FIGS. 5 and 7. In the light ray transmittal schematic of FIG. 7, the medium in this instance is designated M3 and simply provides an electronic signal generating device mounting surface for placement of an electronic signal generating device 46 thereon. Transmission elements previously designated 17 are provided from the generating devices 46 for obvious transmission of and ultimate use of the signal. It should be noted that, in the form shown, the electronic generating device 46 is of reduced size as compared to the image generated on the personal viewing structure of M2. To obtain this size reduction and to acknowledge that such a reduction for convenience as well as other considerations is possible and within the scope of this disclosure. In this instance, the electronic signal generating device 46 is considerably smaller than the formed image of M2. To obtain this required reduction, a lens combination 45 is interposed between the reflective surface of optical element 25 and the medium M3. The distance to the video generating device 46 is then substantially reduced as compared to the focal length exhibited and utilized in medium M or, the film plane medium.

With the light rays L3 impinging upon the surface of the electronic signal generating device 46 an electronic signal is obtained which is useable at any particular instance. The simultaneous electronic capture of the generated signal is simultaneous with the opening of the structure 31 which allow light rays L1 to impinge upon the light responsive film material at medium M such capture being electronically synchronized. Again, as there is no variance between M and M3, the two capture images are equal and of the same tonal quality.

Since the light rays to medium M simply pass through the opening (iris) of the optical member 25 there is no degradation of image quality. This quality is of prime import in the film exposed in medium M for true reproduction of the subject/object.

With the camera system of the invention, the particular optical member which transmits the same light rays to two separate, discrete mediums is of import with the techniques of dual and simultaneous capture with eliminating of light ray degradation being of equal if not greater import. The manipulation of the light rays subsequent to reflection and passing through the optical members elliptical opening permits a simultaneous image on multiple mediums with a very high degree of exactness only obtainable with this invention.

What is claimed is:

1. A camera system for simultaneous and substantially total transfer of light rays from an object to separate, discrete mediums providing identical image reproduction at the mediums, said system including:
  a. a front lens structure arranged and constructed to receive light rays from the object and to direct the same axially thereof;
  b. a first light receiving medium aligned with said axis of said first lens structure to receive transmitted light rays for formation of an image thereon;
  c. a second light receiving medium angularly offset with respect to said axis of said first lens structure to receive transmitted light rays for formation of an image thereon;
  d. an apertured mirror arranged and positioned with respect to said front lens structure and said first and second light receiving mediums to pass light therethrough to said first medium to reflect light to said second medium, transmitting intensities of light to each of said mediums, for the intended purpose, without degradation or decrease of depth of field qualities for the respective images formed thereon;
  e. first and second rear lens structures arranged and positioned respectively between said apertured mirror and said light receiving mediums; and,
  f. light ray control means positioned between a selected one of said mediums and said apertured mirror to control light ray transmission to said medium.

2. The camera system as set forth in claim 1 and said apertured mirror being positioned at a 45 degree angle with respect to the axis of said front lens structure.

3. The camera system as set forth in claim 2 and said first and second light receiving mediums being arranged at right angles to one another and thereby at 45 degree angles with respect to said mirror.

4. The camera system as set forth in claim 1 and said aperture through said mirror constituting an ellipse whereby the apparent axial opening constitutes a circle.

5. The camera system as set forth in claim 1 wherein at least one of said light receiving mediums includes a film plane with means for positioning photographic film thereon.

6. The camera system as set forth in claim 5 wherein the other of said light receiving mediums provides an electronic video medium with means for simultaneous capturing of the image transmitted from the object.

* * * * *